United States Patent
Williams

(10) Patent No.: US 12,263,804 B2
(45) Date of Patent: Apr. 1, 2025

(54) SYSTEMS AND METHODS FOR AIRBAG INFLATOR SECUREMENT

(71) Applicant: Autoliv ASP, Inc., Ogden, UT (US)

(72) Inventor: JD Williams, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 18/241,086

(22) Filed: Aug. 31, 2023

(65) Prior Publication Data

US 2024/0409059 A1   Dec. 12, 2024

Related U.S. Application Data

(60) Provisional application No. 63/471,919, filed on Jun. 8, 2023.

(51) Int. Cl.
*B60R 21/30* (2006.01)
*B60R 21/217* (2011.01)
*B60R 21/26* (2011.01)

(52) U.S. Cl.
CPC .......... *B60R 21/30* (2013.01); *B60R 21/217* (2013.01); *B60R 2021/26088* (2013.01)

(58) Field of Classification Search
CPC .......... B60R 21/30; B60R 21/217; B60R 2021/2178
See application file for complete search history.

(56) References Cited

U.S. PATENT DOCUMENTS

| | | | | |
|---|---|---|---|---|
| 3,801,127 A | * | 4/1974 | Katter | B60R 21/30 417/179 |
| 3,868,125 A | * | 2/1975 | Fisher | B60R 21/30 280/740 |
| 3,909,037 A | * | 9/1975 | Stewart | B60R 21/30 417/179 |
| 3,910,595 A | * | 10/1975 | Katter | B60R 21/30 280/732 |
| 5,085,465 A | * | 2/1992 | Hieahim | B60R 21/30 280/738 |
| 5,100,172 A | * | 3/1992 | VanVoorhies | B60R 21/30 280/739 |
| 5,129,674 A | * | 7/1992 | Levosinski | B60R 21/30 280/743.2 |
| 5,207,450 A | * | 5/1993 | Pack, Jr. | B60R 21/30 280/731 |
| 5,226,670 A | * | 7/1993 | Wright | B60R 21/276 280/732 |

(Continued)

FOREIGN PATENT DOCUMENTS

| | | | |
|---|---|---|---|
| DE | 102012011191 A1 | * 12/2013 | ........... B60R 21/206 |
| EP | 1764272 A1 | * 3/2007 | ......... B60R 21/2171 |

*Primary Examiner* — Timothy Wilhelm
(74) *Attorney, Agent, or Firm* — Foley & Lardner LLP

(57) ABSTRACT

Airbag cushion assemblies for aspirating ambient air and related assemblies, methods, and components. Some embodiments can comprise an aspirating airbag cushion assembly comprising an airbag cushion, which may be configured to deploy from a housing or the like. The assembly can further comprise a securement element to secure an inflator of the airbag cushion assembly during inflation of the airbag cushion. The assembly can further comprise an one or more inflation conduits configured to deliver inflation gas into the airbag cushion through a plurality of aspiration ports.

20 Claims, 12 Drawing Sheets

(56) References Cited

U.S. PATENT DOCUMENTS

| | | | | |
|---|---|---|---|---|
| 5,529,334 | A * | 6/1996 | Meduvsky | B60R 21/2644 |
| | | | | 280/732 |
| 5,533,754 | A * | 7/1996 | Riley | F42B 3/103 |
| | | | | 280/741 |
| 5,681,056 | A * | 10/1997 | Levosinski | B60R 21/2644 |
| | | | | 280/736 |
| 5,816,612 | A * | 10/1998 | Faigle | B60R 21/2644 |
| | | | | 55/330 |
| 5,820,160 | A * | 10/1998 | Johnson | B60R 21/30 |
| | | | | 137/68.13 |
| 10,124,759 | B2 * | 11/2018 | Smith | C06D 5/02 |
| 10,913,423 | B2 * | 2/2021 | Williams | B60R 21/26 |
| 10,913,432 | B1 | 2/2021 | Goldsmith | |
| 10,988,104 | B2 * | 4/2021 | Williams | B60R 21/264 |
| 11,155,235 | B2 * | 10/2021 | Breed | B60R 21/26 |
| 11,794,685 | B2 * | 10/2023 | Williams | B60R 21/217 |
| 2004/0155443 | A1 * | 8/2004 | Ford | B60R 21/276 |
| | | | | 280/739 |
| 2007/0063496 | A1 * | 3/2007 | Yu | B60R 21/261 |
| | | | | 280/736 |
| 2014/0361522 | A1 * | 12/2014 | Breed | B60R 21/30 |
| | | | | 280/738 |
| 2018/0079384 | A1 * | 3/2018 | Smith | C06D 5/02 |
| 2019/0126887 | A1 * | 5/2019 | Williams | B60R 21/36 |
| 2020/0101933 | A1 * | 4/2020 | Williams | B60R 21/26 |
| 2022/0041126 | A1 * | 2/2022 | Breed | B60R 21/30 |
| 2023/0137368 | A1 * | 5/2023 | Williams | B60R 21/30 |
| | | | | 280/740 |
| 2023/0331184 | A1 * | 10/2023 | Williams | B60R 21/26 |
| 2023/0398957 | A1 * | 12/2023 | Williams | B60R 21/2171 |

* cited by examiner

SYSTEMS AND METHODS FOR AIRBAG INFLATOR SECUREMENT

RELATED APPLICATIONS

This application claims priority to U.S. Provisional Patent Application No. 63/471,919, filed Jun. 8, 2023, the entire contents of which are incorporated herein by reference.

TECHNICAL FIELD

The present disclosure relates generally to the field of automotive protective systems. More specifically, the present disclosure relates to inflatable airbag cushion assemblies in a packaged state.

SUMMARY

Disclosed herein are aspirating airbag assemblies having features to improve functionality, manufacturability, stability, or the like, including, for example, features for improvement of aspiration efficiency, improved coupling of various components of the assembly, increased ease of manufacturing, decreased manufacturing costs, and the like.

In some embodiments, the assembly may comprise a threaded inflator cap or securement element configured to retain an inflator coupled with one or more inflation conduits and/or inflation ports at one end of the assembly. The aspiration ports may be configured to increase in size from the inflation side of the assembly to the opposite side in order to generate more consistent flow velocity and/or flow volume throughout the various ports.

Some embodiments may comprise plates and/or caps at one or both ends, one or both of which may comprise coupling members, such as clips and/or prongs, which may be used to facilitate slidable coupling and/or locking of such components.

The features, structures, steps, or characteristics disclosed herein in connection with one embodiment may be combined in any suitable manner in one or more alternative embodiments.

BRIEF DESCRIPTION OF THE FIGURES

Non-limiting and non-exhaustive embodiments of the disclosure are described, including various embodiments of the disclosure with reference to the following figures.

DETAILED DESCRIPTION

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The phrase "coupled to" is used in its ordinary sense and is broad enough to refer to any suitable coupling or other form of interaction between two or more entities, including mechanical, fluid, and thermal interaction. Two components may be coupled to each other even though they are not in direct contact with each other.

The phrase "attached to" refers to interaction between two or more entities which are in direct contact with each other and/or are separated from each other only by a fastener of any suitable variety (e.g., mounting hardware or an adhesive).

The phrase "fluid communication" is used in its ordinary sense and is broad enough to refer to arrangements in which a fluid (e.g., a gas or a liquid) can flow from one element to another element when the elements are in fluid communication with each other.

The terms "longitudinal" and "longitudinally" refer to a direction or orientation extending or spanning between a front of a vehicle and a rear of the vehicle.

Inflatable airbag systems are widely used to reduce or minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" generally refers to an inflatable curtain airbag or cushion, although the principles discussed may apply to other airbag types in other embodiments.

Figure 1:
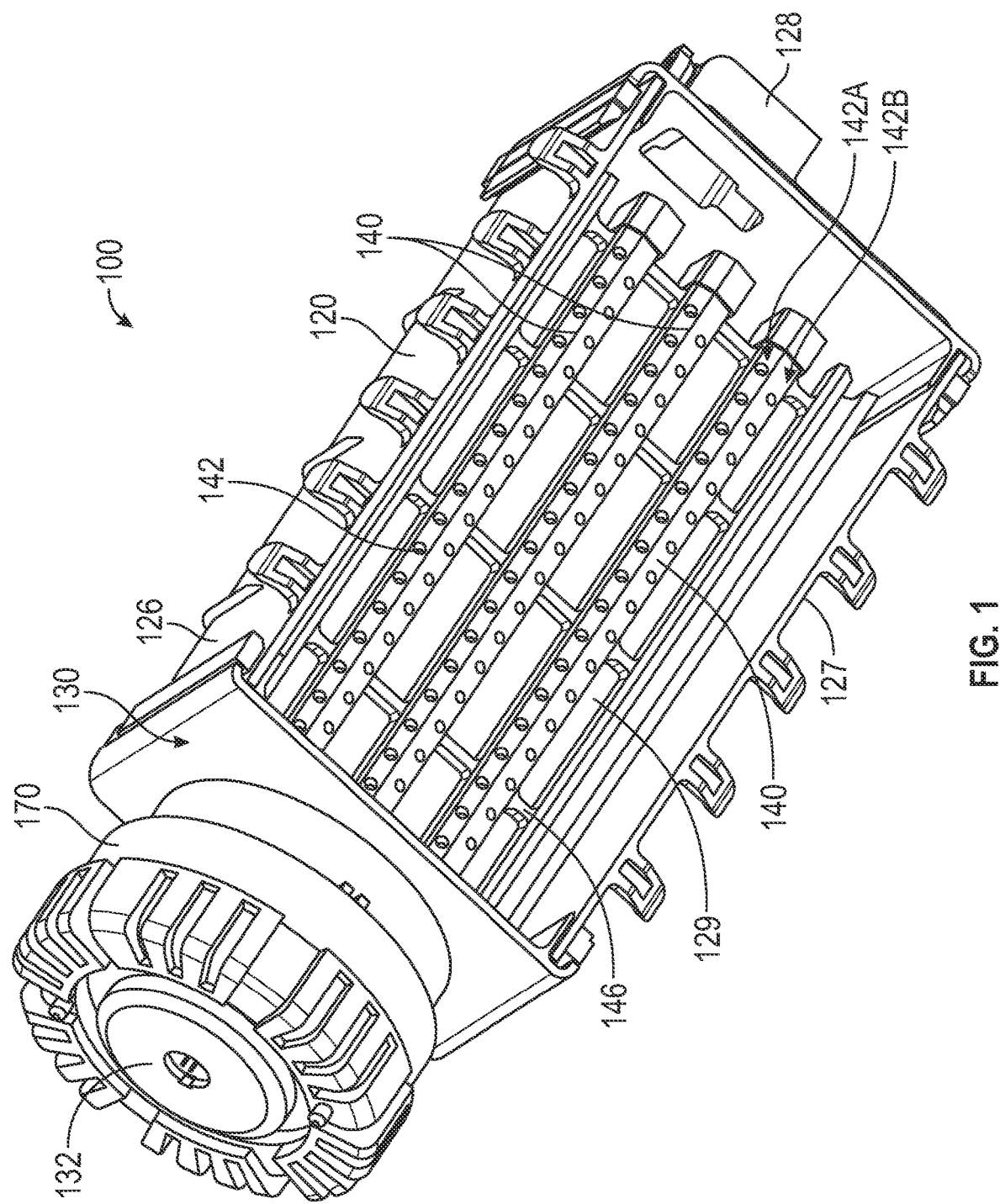
FIG. 1 is a perspective view of an aspirating airbag inflation assembly, according to some embodiments.

FIG. 1 depicts an aspirating airbag inflation assembly 100, according to some embodiments of the present disclosure. The aspirating airbag inflation assembly 100 comprises an airbag cushion package 110 (not shown in FIG. 1, see FIG. 7A), which includes an airbag cushion 124 (not shown in FIG. 1; see FIG. 7A) positioned and configured to deploy therefrom. The aspirating airbag cushion assembly 100 further comprises an aspiration housing 120 coupled to the airbag cushion package 110. The aspiration housing 120 comprises an open portion (e.g., a first opening) at its upper side 114 (not shown in FIG. 1, see FIG. 3) for receiving an airbag cushion 124 and/or coupling and/or receiving the airbag cushion package 110, which may be followed by covering the open region 114. The aspirating airbag cushion package 110 may be attached to the aspiration housing 120 with a pair of longitudinal rails 113 (not shown in FIG. 1, see FIG. 7A) to hold the airbag cushion 124 in place for packaging and deployment. Opposite this open side, the aspiration housing 120 comprises an aspiration inlet 122 (e.g., a plurality of openings, not shown in FIG. 1, see FIG. 6B) configured to allow for receipt of ambient air into the airbag cushion 124 during inflation. The aspiration inlet 122 facilitated introduction of ambient air into the airbag cushion 124 via aspiration during inflation of the airbag cushion 124. The aspiration housing 120 may further comprise an airbag tether release frame 128, which may project from a side of the aspiration housing 120. The aspiration housing 120 may be formed (e.g., made) of any one of one or more suitable materials having a predetermined degree of rigidity. For example, each portion of the aspiration housing 120 may be may be formed from (e.g., made of) a rigid, or semi-rigid, material, such as a plastic material, a polymer, a metal, metal alloy, or any other suitable material having a predetermined degree of rigidity and/or plasticity.

Figure 6A:
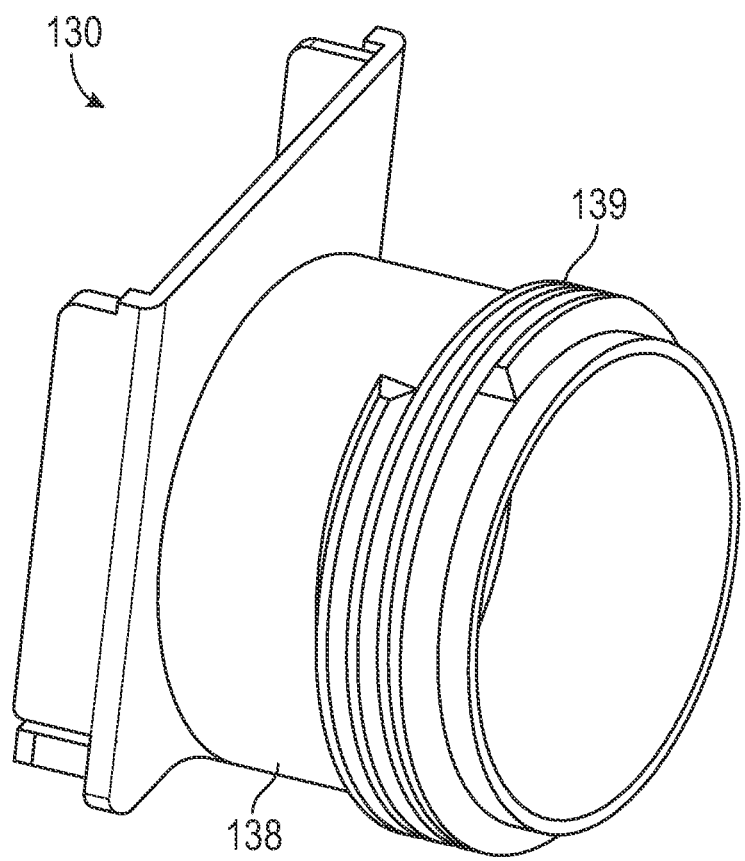
FIG. 6A is a perspective view of a support element of an aspirating airbag inflation assembly, according to some embodiments.
Figure 6B:
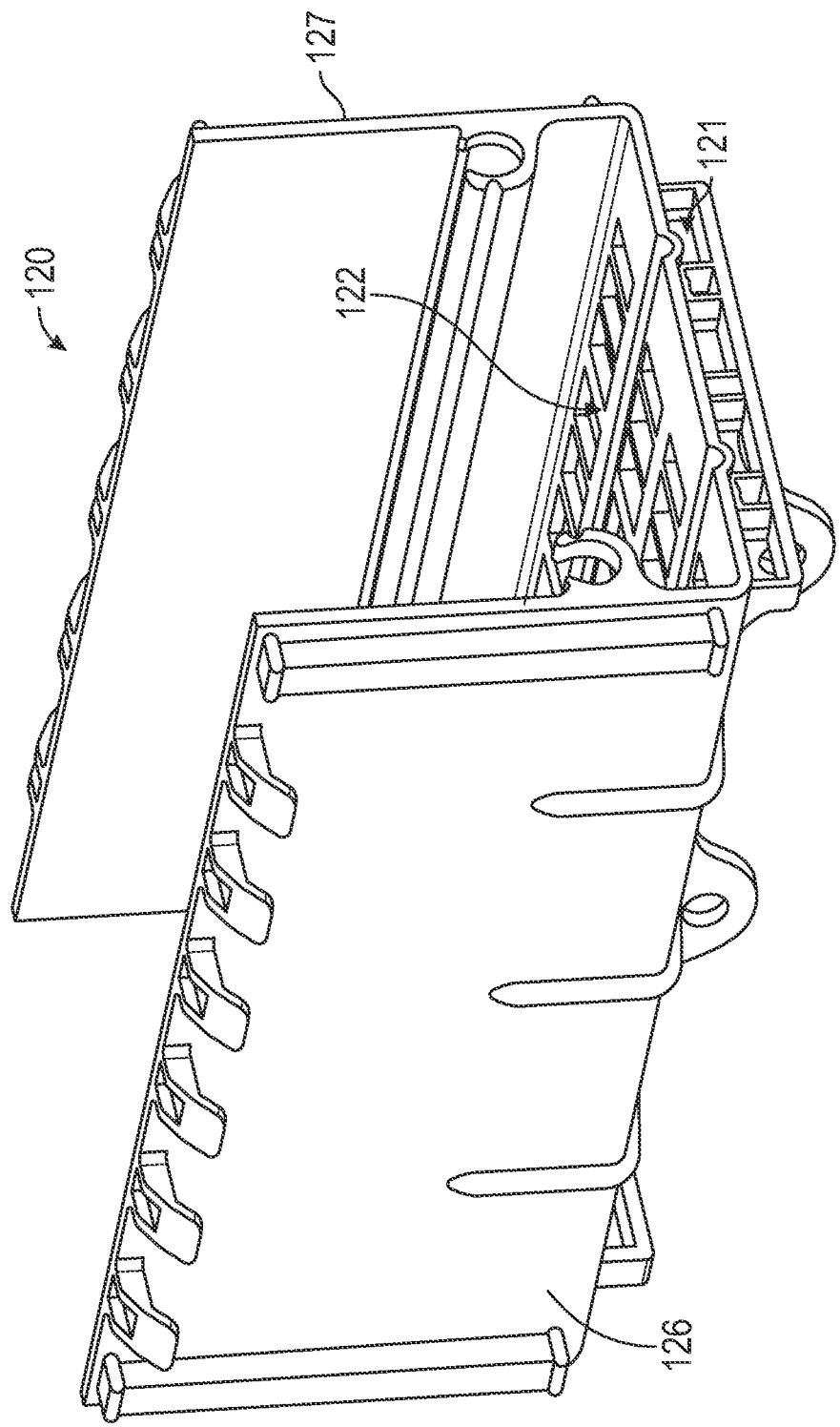
FIG. 6B is a perspective view of an aspiration housing of an aspirating airbag assembly, according to some embodiments.

In the depicted embodiment, the aspiration inlet includes a plurality of openings 122 aligned in a grid pattern along the first side 129 (e.g., bottom surface) of the aspiration housing 120, which openings are defined by cross-members and inflation conduits 140 (shown in FIG. 6B). However, it is contemplated that, in alternative embodiments, the aspiration inlet may comprise a single opening (in some such embodiments, the entire lower side of the aspiration housing 120 may be open) or may comprise any other suitable number of openings 122 as desired.

An inflation module 130 may be coupled to the aspiration housing 120 to be an end plate 131 of the aspiration housing 120. As described in greater detail below, in some embodiments, the inflation module 130 may be slidably coupled to the aspiration housing 120. Alternatively, as also described in greater detail below (see FIGS. 5 and 6A-C), the inflation module 130 can be configured with a plurality of coupling members (not shown) substantially similar to the coupling members 151 (shown in FIG. 6C), which may be configured to be coupled with (e.g., received by) a corresponding plurality of slots, or brackets, formed in the aspiration housing 120.

Figure 4A:
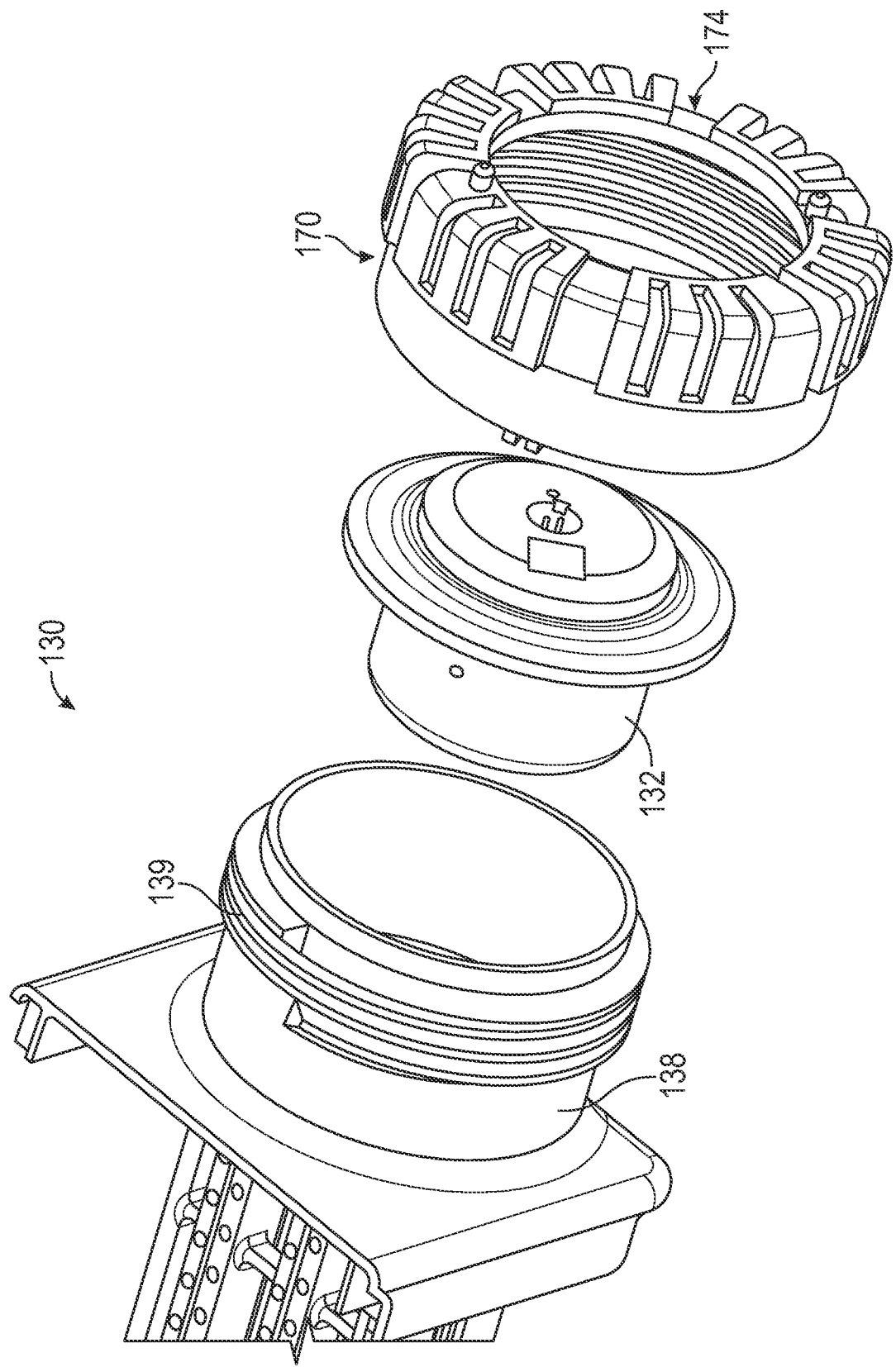
FIG. 4A is a close-up, exploded view of an aspirating airbag inflation assembly, according to some embodiments.
Figure 4B:
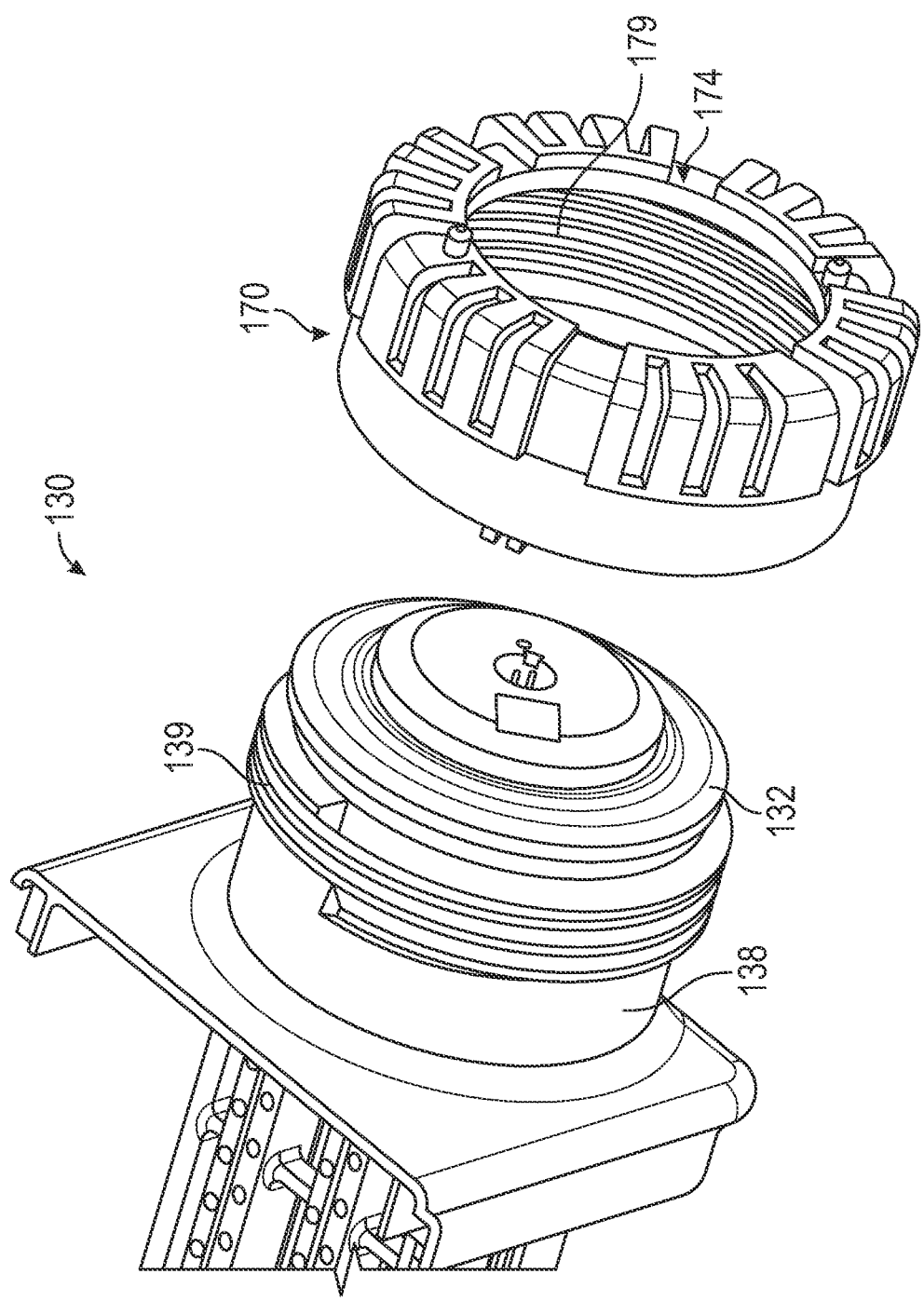
FIG. 4B is a close-up, partially exploded, view of and aspirating airbag inflation assembly, according to some embodiments.
Figure 4C:
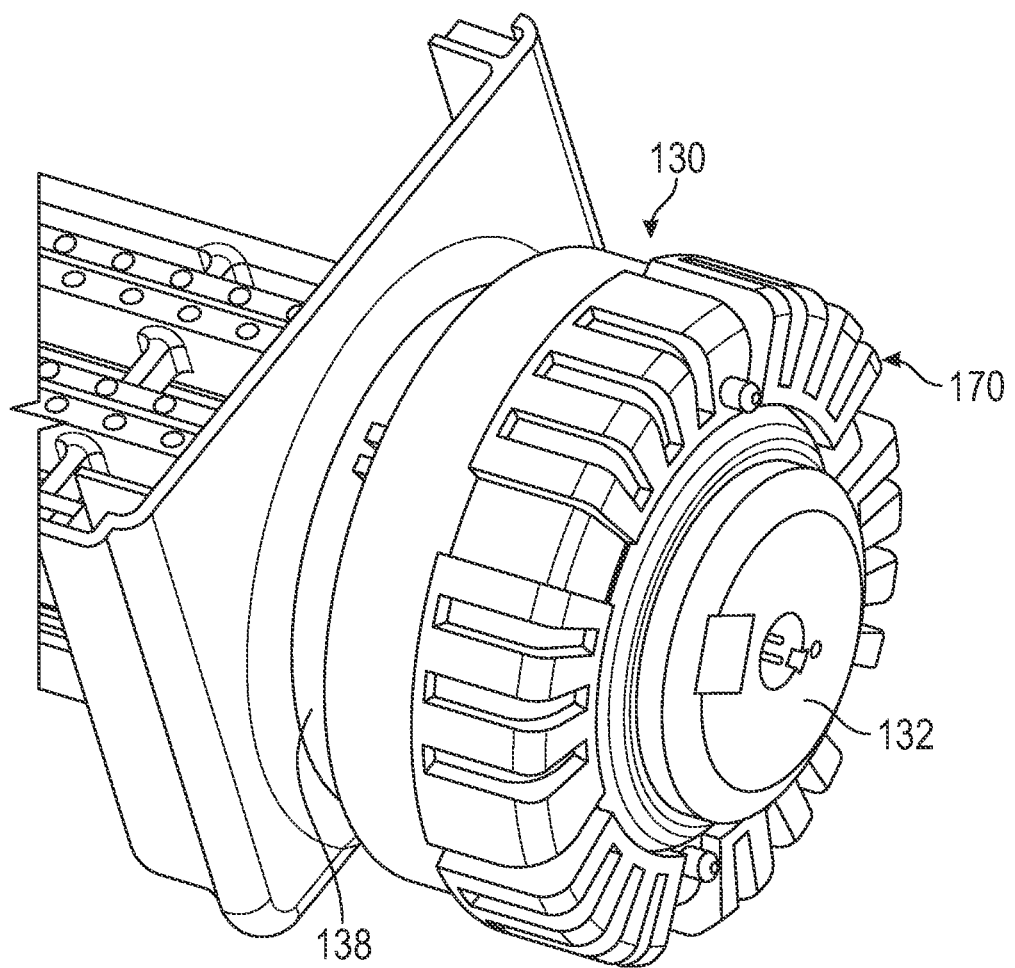
FIG. 4C is a close-up perspective view of an aspirating airbag inflation assembly, according to some embodiments.

The inflation module 130 further includes (e.g., is configured to physically receive and/or house) an inflator 132, which may include, for example, a disc inflator to be fixedly positioned at the end plate 131. However, other embodiments are contemplated in which the inflator 132 may instead comprise another type of inflator, such as a tubular inflator or another suitable inflator type. The inflation module 130 may further comprise a securement element 170 (alternatively referred to as a ring, endcap, cap, engagement element, annular securement member, securement ring, or nut), which is configured to physically couple with (e.g., mate to) the inflation module 130 with the inflator 132 at least partially disposed within the inflation module 130. More specifically, the inflation module 130 may, in some embodiments, be configured to be threadably coupled with the securement element 170 (e.g., via a plurality of mating threads of the inflation module 130 and the securement element 170, as shown in FIGS. 4A-C). Accordingly, in some embodiments, the securement element 170 comprises a plurality of mating threads (not shown in FIG. 1, see, e.g., FIGS. 4A-B) to engage the plurality of threads of the inflation module 130 and retain the inflator 132 within the inflation module 130 during inflation of the airbag cushion 124. The securement element 170 may be formed (e.g., made) of any one of one or more suitable materials having a predetermined degree of rigidity and plasticity. For example, the securement element 170 may be formed from (e.g., made of) a rigid, or semi-rigid, material, such as a plastic material, a polymer, a metal material, metal alloy, or any other suitable material having a predetermined degree of rigidity and plasticity.

The aspiration housing 120 may comprise a first or lower side 129 including an aspiration inlet, as mentioned above, that may be configured to allow for receipt of ambient air into the airbag cushion 124 during inflation. The aspiration housing 120 may further comprises a second or upper side opposite from the first side that is configured to receive the airbag cushion 124 and/or airbag cushion package 110 therein. A third side 126 of the aspiration housing 120 extends between the upper and lower sides and may be closed or at least substantially closed and may define a sidewall of the aspiration housing 120. Similarly, a fourth side 127 of the aspiration housing 120 extends between the upper and lower sides, opposite the third side 126, and may be closed or at least substantially closed and may define a sidewall of the aspiration housing 120. In some embodiments, the inflation module 130 may be configured to be received in the open side of the aspiration housing 120 and to close this side/opening upon being fully coupled with, which in the case of the depicted embodiment means fully slid into, the inflation module 130.

The inflation module 130 further comprises a plurality of inflation conduits 140 (e.g., tubes), which are fluidly coupled with the inflator. Each of the inflation conduits 140 comprises a plurality of inflation or aspiration ports 142 (hereafter referred to as aspiration ports since they assist in drawing ambient air into the cushion 124 during inflation) and each of the inflation conduits 140 and/or aspiration ports 142 is configured to deliver inflation gas from the inflator 132 into the airbag cushion 124. Preferably, assembly 100 is configured such that the inflation gas is delivered at a sufficiently high velocity to draw ambient air through the aspiration inlet and into the airbag cushion 124 during inflation. In alternative embodiments, each of the aspiration ports 142 may be formed as a nozzle or the like (e.g., configured to define a nozzle and/or formed in, or through, a nozzle), which may extend from one or more of the inflation conduits 140. The inflation module 130 (e.g., end plate 131 and/or support element 138) may be formed (e.g., made) of any one of one or more suitable materials having a predetermined degree of rigidity and plasticity. For example, the inflation module 130 may be formed from (e.g., made of) a rigid, or semi-rigid, material, such as a plastic material, a polymer, a metal material, metal alloy, or any other suitable material having a predetermined degree of rigidity and plasticity.

As depicted in the embodiment of FIG. 1, in some embodiments, the aspiration ports 142 may also, or alternatively, be formed in rows that are staggered and/or offset relative to each other rather than each being aligned relative to each other (e.g., along a center of) along the length of each inflation conduit 140. The aspiration ports 142 are formed within each inflation conduit 140 in two opposing rows. Thus, the aspiration ports 142a are part of a first row of the aspiration ports 142 and the aspiration ports 142b are part of a second row of the aspiration ports 142, with each of the aspiration ports in the first and second rows 142a, 142b staggered relative to each other, as mentioned previously (and as visible in FIG. 1). These two rows are offset from one another relative to the longitudinal axis (e.g., middle or center) of each inflation conduit 140. In other words, if the longitudinal axis is a center line bisecting the length of each inflation conduit 140, each of the aspiration ports 142*a* in one row is offset from the longitudinal axis, and from the aspiration ports 142*b* of the second row, towards a first side of the inflation conduit 140 and each of the aspiration ports 142*b* in a second row of aspiration ports is offset from the longitudinal axis of the inflation conduit 140 and from the aspiration ports 142*a* of the first row of aspiration ports 142 and towards a second side of the same inflation conduit 140 (e.g., a side opposite from the first side of the inflation conduit 140).

Additionally, the aspiration ports 142*a* in the first row are staggered or offset from the aspiration ports 142*b* in the second row such that each of the aspiration ports 142*a* of the first row is positioned at a location along the longitudinal axis of the inflation conduit 140 that is different from a location along the longitudinal axis at which an adjacent aspiration port 142*b*, of the aspiration ports 142*b* in the second row, is positioned. This staggered placement of the aspiration ports 142*a* and 142*b* of assembly 100 may have several benefits. For example, having the ports staggered may provide increased strength to the assembly to improve deployment loading strength. This may also provide for an increased area between the closest ports of the opposing rows to increase part strength.

Additionally, the inflation gas (e.g., jets) delivered through the aspiration ports 142 may thereby be positioned closer to the opposing edges of the inflation conduits 140, which may allow for a more efficient aspiration system by generating better aspiration flow. The resulting improved aspiration may include, for example, aspiration facilitated by one or more supersonic plumes of gas closer to the edge of the inflation conduit 140, including the positions of one or more corresponding regions of relatively low-pressure generated by the one or more supersonic plumes of gas. More specifically, the one or more supersonic plumes of inflation gas may include high-velocity gases, which occur near regions of the assembly 100 where the ambient air is to be pulled into the airbag cushion 124 at a predetermined volume and during inflation of the airbag cushion 124, which may, in some embodiments, more efficiently aspirate ambient air into the airbag cushion 124 during inflation. The flow of inflation gas during inflation of the airbag cushion 124, according to the embodiments described herein, may also improve the vacuum pressure within the airbag cushion 124 to aspirate more ambient air into the airbag cushion 124 relative to the amount of inflation gases needed to generate the flow of ambient air into the airbag cushion 124, thereby preferably making the aspiration ratio of the assembly 100 higher.

The aspiration ports 142 may be spaced apart from one another sufficiently that the streamlines of the expanding gas may not intersect, or at least intersect minimally. Thus, preferably the aspiration ports 142 are spaced apart with an appropriate (e.g., maximum) amount of space in between each adjacent port within the area allotted to the aspiration inlet, such as the case in the embodiment depicted in FIG. 1. Additionally, in the embodiment shown in FIG. 1, the assembly 100 further comprises a frame defined by a plurality of cross-support members 146 extending between, and disposed perpendicular to, the inflation conduits 140, which may provide increased strength to the assembly 100 including during airbag deployment (e.g., during inflation of the airbag cushion 124).

Figure 2:
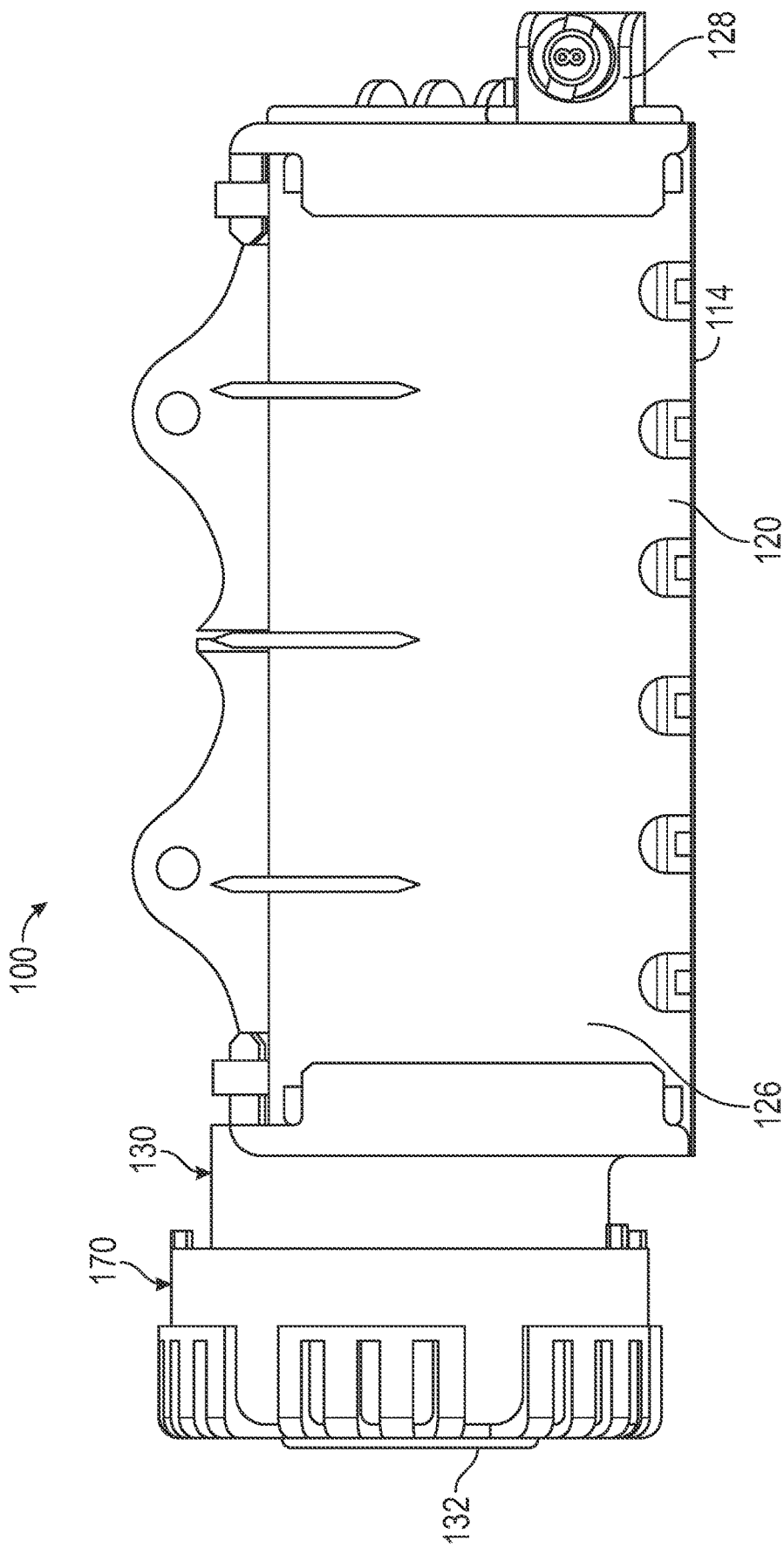
FIG. 2 is a side elevation view of an aspirating airbag inflation assembly, according to some embodiments.

FIG. 2 depicts an aspiration airbag inflation assembly 100 from a side elevation view, according to some embodiments. As can be seen, and as described above, the assembly 100 comprises a securement element 170, an inflation module 130, an aspiration housing 120 and the airbag tether release frame 128, which may project from a side of the aspiration housing 120. An inflation module 130 may be coupled to the aspiration housing 120. As described in greater detail below, in some embodiments, the inflation module 130 may be fixedly coupled to (e.g., physically connected with) the aspiration housing 120 of the assembly 100 to fixedly position the inflator 132 at the end plate 131 (e.g., during inflation of the airbag cushion). Alternatively, as also described in greater detail below (see FIGS. 5 and 6A-C), the inflation module 130 can similarly be configured to be fixedly coupled to the aspiration housing 120 of the assembly 100. For example, in some embodiments, the inflation module 130 may include a plurality of coupling members (not shown) that are substantially similar to the coupling members 151 (shown in, and described with reference to, FIG. 6C), which may be configured to be coupled with (e.g., received by) a corresponding plurality of slots, or brackets, formed in the aspiration housing 120, which may be substantially similar to the plurality of slots, or brackets, 121 shown in, and described with reference to, FIG. 6B.

As described above, the inflation module 130 may further include the inflator 132, which may be a disc inflator physically retained by the securement element 170. However, other embodiments are contemplated in which the inflator 132 may instead comprise another type of inflator, such as a tubular inflator or another suitable inflator type. The inflation module 130 may further comprise a securement element 170 (alternatively referred to as a ring, endcap, cap, engagement element, annular securement member, securement ring, or nut), which is configured to physically couple with (e.g., mate to) the inflation module 130 with the inflator 132 at least partially disposed within the inflation module 130. More specifically, the inflation module 130 may, in some embodiments, be configured to be threadably coupled with the securement element (e.g., via a plurality of mating threads of the inflation module 130 and the securement element 170, as shown in FIGS. 4A-C). Accordingly, in some embodiments, the securement element 170 comprises a plurality of mating threads 179 (not shown in FIG. 2, see, e.g., FIGS. 4A-B) to engage the plurality of threads of the inflation module 130 and retain the inflator 132 within the inflation module 130 during inflation of the airbag cushion 124.

The aspiration housing 120, as described above, may include a first or lower side 129 comprising an aspiration inlet that may be configured to allow for receipt of ambient air into the airbag cushion 124 during inflation of the airbag cushion 124. The aspiration housing 120 may further include a second or upper side 114, opposite from the first side 129, from which the airbag cushion 124 and/or airbag cushion package 110 is configured to deploy. The third side 126 of the aspiration housing 120, as mentioned previously, may extend orthogonal to the upper and lower sides 114, 129 and may be closed or at least substantially closed to form a sidewall of the aspiration housing 120. Similarly, the fourth side 127 (not shown in FIG. 2, see FIG. 1) of the aspiration housing 120 may extend between the upper and lower sides 114, 129, but disposed opposite the third side 126, and may form the sidewall of the aspiration housing 120 opposite the sidewall of the third side 126.

Figure 3:
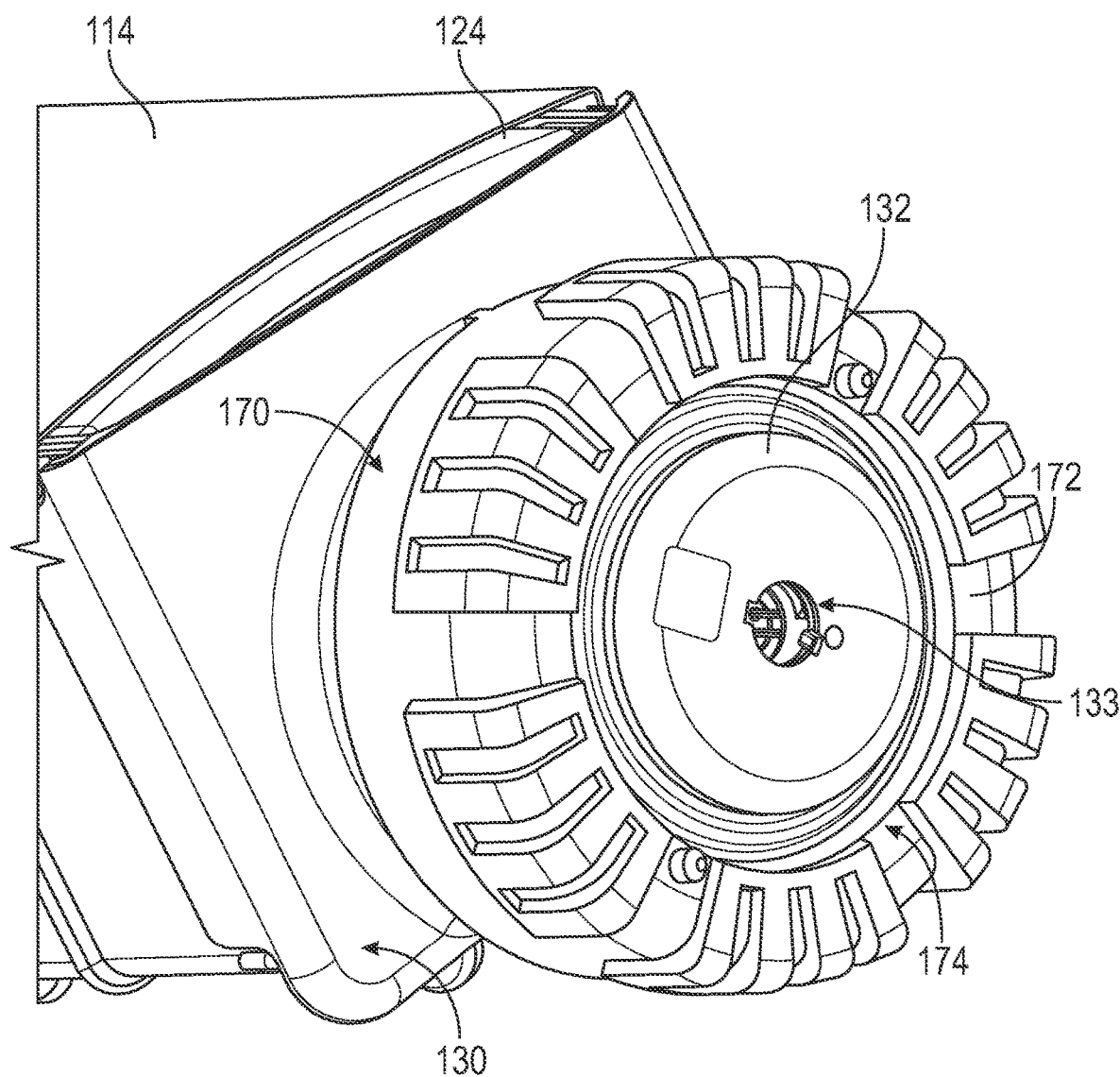
FIG. 3 is a close-up, perspective view of an aspirating airbag inflation assembly, according to some embodiments.

FIG. 3 depicts a close-up, perspective view of the aspirating airbag inflation assembly 100, according to some embodiments. The assembly 100 may include airbag cushion 124 and the inflation module 130, which includes a support element 138, the inflator 132, and the securement element 170. Additionally, the perspective view of the assembly 100, as can be seen, illustrates the top surface 114 of the assembly 100 from which the airbag cushion 124 may be deployed (e.g., during inflation of the airbag cushion 124). The inflation module 130 can include, in some embodiments, a support element 138 at an endplate 131 of the aspiration housing 120, the support element 138 configured to receive the inflator 132 to be disposed in fluid communication with the aspiration inlet 122 (e.g., a plurality of openings, not shown in FIG. 3, see FIG. 6B) and, with securement element 170, physically retain the inflator 132 at the end plate 131 of the aspiration housing 120. Accordingly, the inflation module 130 may, together with the securement element 170, retain the inflator 132 in a fixed position at the endplate 131 of the aspiration housing 120 and within the support element 138 (e.g., alternatively, a nozzle, a port, or an inflator housing) of the inflation module 130 (e.g., substantially prohibiting physical movement and/or displacement of the inflator 132 during inflation of the airbag cushion of the assembly 100).

Additionally, the inflator 132 further includes an actuation port 133 (alternatively referred to as activation port), which may be used to establish electrical communication between the inflator 132 and one or more additional components (not shown) and may facilitate actuation of the inflator 132 to initiate inflation of the airbag cushion 124. The securement element 170 includes a base surface 172 and an opening 174 formed in the base surface 172 and configured to facilitate a physical connection (e.g., via one or more wires) at the actuation port 133 of the inflator 132 while the inflator 132 is fixed within the support element 138 (or within the inflation module 130) and with the securement element 170 fixedly coupled to the support element 138 of the inflation module 130.

FIG. 4A is an exploded view of the inflation module 130 further illustrating various features of some embodiments. With the securement element 170 exploded away (e.g., detached or unscrewed), the inflator 132 can be seen as well as additional features of the inflation module 130. For example, as can be seen in FIG. 4A, the inflation module 130 comprises (e.g., forms) the support element 138 (alternatively referred to as a port, hub, cylindrical hub, receiving element, threaded receiver, engagement element, and positioning element) at the endplate 131 of the aspiration housing 120, which may include a plurality of threads 139 configured to be physically coupled with, or mate to, a corresponding plurality of mating threads 179 of the securement element 170. In this manner, the securement element 170 can be threadably coupled with the support element 138 with the inflator 132 positioned within the support element 138 for the inflator to remain fixedly positioned (e.g., disposed) at the end plate 131 of the aspiration housing 120, including, for example, during inflation of the airbag cushion. In another embodiment, the support element 138 may include a plurality of mating threads (e.g., instead of the plurality of threads 139) and the securement element may include a plurality of threads (e.g., instead of the plurality of mating threads 179). Stated differently, the male and/or female threads may each be included in either of the support element 138 or the securement element 170 with the corresponding plurality of female or male (e.g., mating) threads included in the other of the support element or the securement element 170.

As described above, inflatable airbag systems are widely used to reduce or minimize occupant injury in a collision scenario and modern motor vehicles may include airbag modules installed at various locations within a vehicle, including, but not limited to, the steering wheel, the instrument panel, within the side doors or side seats, adjacent to the roof rail of the vehicle, in an overhead position, or at the knee or leg position. Existing airbag inflation assemblies may include one or more components configured for a plurality of different functions. For example, existing airbag cushions may include a single component that physically secures both an airbag cushion and a corresponding inflator inside of a corresponding airbag housing. More specifically, presently available airbag inflation systems may include a retainer ring disposed inside of an airbag cushion, which includes a plurality of threaded studs and which may be physically fastened to an interior of the airbag assembly housing, including an associated inflator flange (e.g., protrusion configured to physically contact and abut an inflator of the airbag inflation assembly) by one or more nuts threaded onto the one or more threaded studs of the retainer. Additionally, existing airbag systems may be configured with the retainer ring, which retains both an airbag cushion and an inflator, to adequately manage the inflator thrust loading (e.g., based on an amount of inflation gas output by the inflator) during inflation of the airbag cushion (e.g., to sufficiently secure an inflator based on an associated performance and/or output).

Aspirating airbag systems (e.g., airbag systems that are, as described herein, configured to allow outside air to enter the airbag assembly during airbag inflation), however, can be configured to physically secure both an airbag cushion and an inflator with one or more respective components. For example, an aspirating airbag assembly may include an airbag cushion physically coupled to the housing (e.g., via a pair of rails) and an external securement element (e.g., a cap) to physically secure an inflator, including aspirating airbag assemblies configured to operate using a decreased amount of inflation gas (e.g., an inflator with a lower output) compared to existing airbag assemblies. Accordingly, in some examples, an aspirating airbag inflation assembly may include an inflator with lower performance and/or output gas compared to an inflator of a non-aspirating airbag assembly (e.g., an airbag assembly that is not configured for ambient air to enter the airbag cushion during deployment). Additionally, in some examples, an aspirating airbag assembly can include a securement element (e.g., external cap) configured to adequately secure an inflator of the airbag assembly, which may be based on the corresponding inflator thrust loading, according to one or more of the examples disclosed herein.

Therefore, the assembly 100, including the securement element 170 to fasten the inflator 132, differs from, and improves upon, the presently available ways of securing an inflator within the inflation assembly 100 in a number of ways. More specifically, the use of securement element 170 can permit the replacement of the inflator 132 without replacing the entire assembly 100. For example, in some scenarios replacement of the inflator 132 may be advantageous (or required) because of an expiration date associated with the inflator 132, a recall associated with the inflator 132, an improved type of inflator 132 capable of superior operation (e.g., improved inflation of the airbag cushion 124), among other reasons. The securement element 170 permits the replacement of the inflator 132 without the increased costs associated with replacement of the entire assembly 100 (e.g., without removing an assembly 100 configured within an automobile and/or without the costs associated with manufacturing an entirely new assembly 100 and/or airbag cushion). Additionally, the use of securement element 170. The use of securement element 170 provides sufficient means of fastening or otherwise securing the inflator 132 while still permitting replacement of inflator 132 without requiring replacement of the assembly 100.

The securement element 170 includes an opening 174 in a base surface (alternatively referred to as a planar surface or cap base) 172 of the securement element 170, which can be configured to receive an activation connector (e.g., one or more wires) to the activation port 133 for activating the inflator 132 (e.g., to facilitate an electrical connection between one or more additional components and the inflator 132 via an electrical connector coupled to the activation port 133). As can be seen for the embodiment depicted in FIG. 3, the opening 174 and the base surface 172 can be circularly shaped and the securement element 170 is formed with a ring shape. In other embodiments, however, the securement element 170 may be shaped differently and need not be ring shaped. For example, in another embodiment, the opening 174 may be positioned in, or formed by, the base surface 172 to be offset from the center of a circularly shaped securement element 170 (e.g., with an activation port 133 of the inflator 132 similarly disposed in an offset, or non-centered, location on the inflator 132).

In another embodiment, the opening 174 of the securement element 170 may be formed with a non-circular shape in the base surface 172 of the securement element 170. For example, the opening 174 may be an opening that is shaped as a hexagon, octagon, or other non-circular geometric shape, and may be configured to allow a physical connection to (e.g., facilitate electrical coupling at) the activation port 133 of the inflator 132 while it is disposed within the support element 138 and with the securement element 170 threadably coupled to the support element 138.

Moreover, in some embodiments, the opening 174 may be sized differently than the particular embodiment shown in FIG. 4A. For example, the opening 174 may be smaller than the size shown in FIG. 4A, including potentially an opening 174 that is substantially the same size as (or slightly larger than) the activation port 133 of the inflator. In still other embodiments, the opening 174 may be larger than the particular size shown in FIG. 4A, which may be based on the physical dimensions of the inflator 132 and of the support element 138.

The interior of the support element 138, which is the portion that is shown in the embodiment as a cylindrical shaped nozzle that receives the inflator 132 and also couples to the securement element 170, may be configured to permit the flow of inflation gas from the inflator 132 upon actuation of the inflator 132 for inflation of the airbag cushion 124. More specifically, the interior of the support element 138 may be formed with a size that is greater than the diameter of the portion of the inflator 132 received by the support element 138, which can be a predetermined size to facilitate sufficient flow of inflation gas from the inflator 132 during inflation of the airbag cushion 124.

FIG. 4B is a different partially exploded view of the inflation module 130 that illustrates the inflator 132 disposed within the support element 138 and with the securement element 170 exploded (e.g., removed, unscrewed, detached), according to some embodiments. With the securement element 170 separated away the inflator 132 can be seen, which is shown received by (e.g., disposed within) the support element 138 (or port) of the inflation module 130. Additionally, as can be seen, the securement element 170 includes a plurality of mating threads 179 formed on an interior surface of the securement element 170, which are visible through the opening 174 of the securement element 170 and which are configured to be threadably coupled with the corresponding plurality of threads 139 formed on the support element 138.

Accordingly, and as described above, the inflation module 130 may, together with the securement element 170, retain the inflator 132 in a fixed position at the endplate 131 of the aspiration housing 120 and within the support element 138 (e.g., substantially prohibiting physical movement and/or displacement of the inflator 132 during inflation of the airbag cushion of the assembly 100).

FIG. 4C is a perspective view of the inflation module 130 with the inflator 132 secured in the interior of the support element 138 by the securement element 170, which is threaded (via the plurality of threads 139 and the plurality of mating threads 179 of FIGS. 4A and 4B) onto the support element 138 of the inflation module 130 to fasten the inflator 132 at the end plate 131. As can be seen, in the depicted embodiment, the inflator 132 can protrude or physically extend, at least partially, from the opening 174 of the securement element 170. In other embodiments, however, the inflator 132, the securement element 170, or both, may be configured without any portion of the inflator 132 extending from the opening 174 of the securement element 170 when the inflator 132 is fixedly positioned within the inflation module 130 via the securement element 170. Additionally, the particular physical dimensions of the securement element 170 may differ from those of the depicted embodiment. For example, in different embodiments, the securement element 170 (and/or the support element 138) may be configured to extend a greater distance from the aspiration housing 120, such as to receive a larger inflator 132 or to accommodate a greater number of mating threads formed on both the support element 138 and the securement element 170. Accordingly, the securement element 170 may be configured to match the dimensions of the support element 138 as described above (e.g., with a greater depth to accommodate a greater number of mating threads formed on the interior of the securement element 170).

Figure 5:
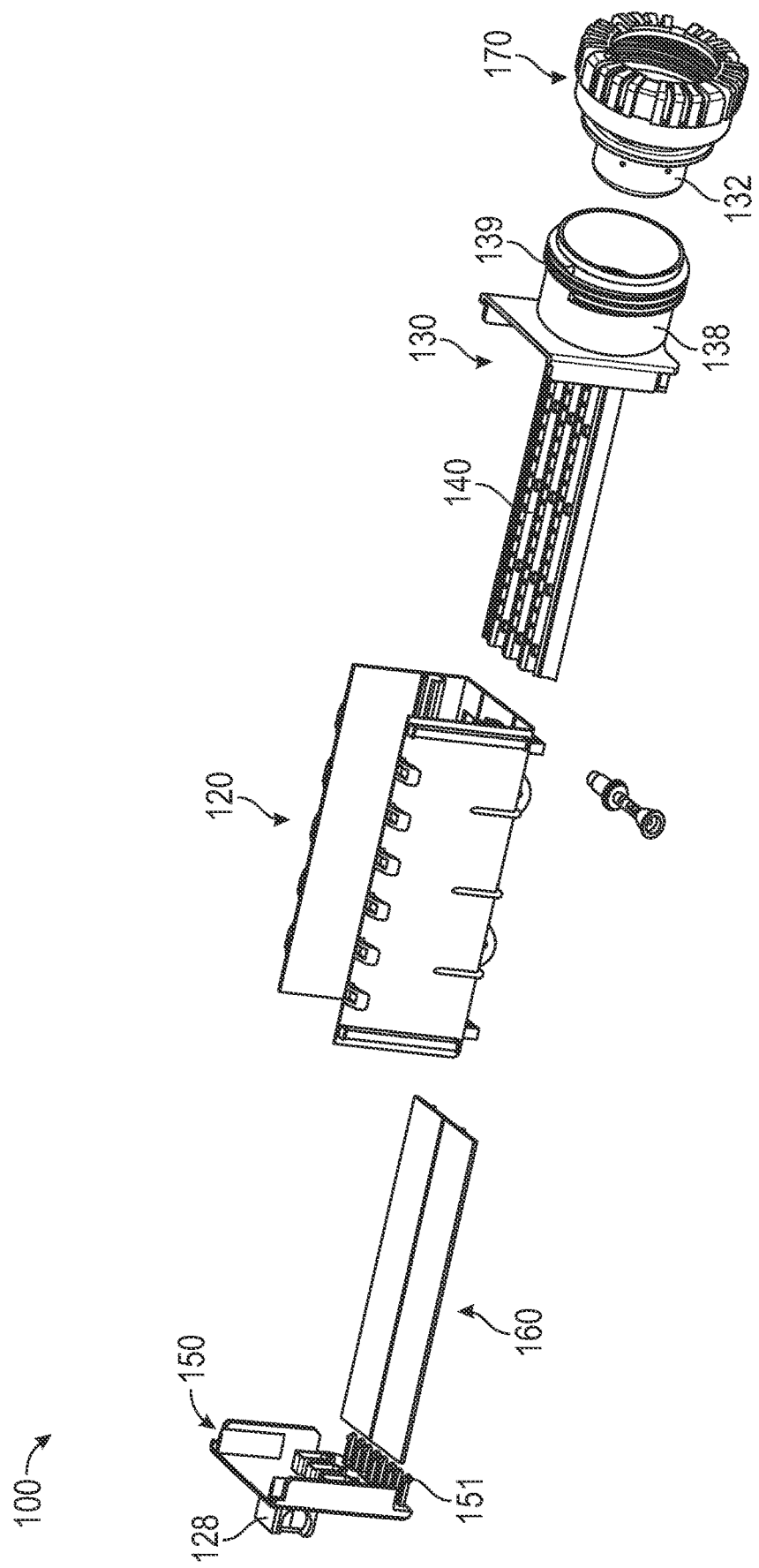
FIG. 5 is an exploded view of an aspirating airbag inflation assembly, according to some embodiments.

FIG. 5 is an exploded view of the aspirating airbag inflation assembly 100 further illustrating various features, according to some embodiments. As in other figures, with the securement element 170 exploded away from the inflation module 130 the inflator 132 can be seen. The inflation module 130, as can be seen, includes the support element 138 having the plurality of threads 139 formed on its outer surface. As can also be seen in FIG. 5, and as described above, the securement element 170 includes a corresponding plurality of mating threads 149 configured to be threadably coupled with the plurality of threads 139 of the support element 138 with the inflator 132 fixedly positioned within the support element 138 (e.g., held in place by the securement element 170).

Moreover, the assembly 100 can include a valve assembly 160, as shown in FIG. 5, which may comprise one or more valves configured to automatically open upon actuation of the inflator 132 and configured to automatically close during inflation of the airbag cushion 124 (not shown in FIG. 5, see FIGS. 3, 7A, and 7B) to prevent air and inflation gas from exiting through the aspiration inlet of the assembly 100. In some embodiments, the one or more valves of the valve assembly 160 may be configured to automatically close at a predetermined stage during inflation of the airbag cushion 124. For example, the one or more valves of the valve assembly 160 may be configured to close upon a predetermined degree of expansion of the airbag cushion 124 during inflation of the airbag cushion 124.

The aspirating airbag inflation assembly 100 further includes a side plate 150, which may itself include a plurality of coupling members 151 configured to fixedly couple the side plate 150 to the aspiration housing 120. In the embodiment depicted in FIG. 5, the plurality of coupling members 151 includes a plurality of clips configured to be received in one or more corresponding slots or brackets of a plurality of brackets 121 formed in the aspiration housing 120, as described in greater detail below with reference to FIGS. 6B and 6C.

FIG. 6A is a perspective view of the inflation module 130, without the inflator 132 or securement element 170, according to some embodiments. As described in greater detail above, in some embodiments, the inflation module 130 may be configured to be physically coupled to the aspiration housing 120 to form the end plate 131 of the aspiration housing 120. Alternatively, as also described in greater detail above the inflation module 130 can be configured with a plurality of coupling members (not shown) substantially similar to the plurality of coupling members 151 (shown in, and described with reference to, FIG. 6C) of the side plate 150, which may be configured to be coupled with (e.g., received by) a corresponding plurality of slots, or brackets (not shown), formed in the aspiration housing 120 similar to the plurality of slots, or brackets, 121 that are shown in, and described with reference to, FIG. 6B.

As described above, the inflation module 130 can further comprise an inflator (not shown in FIG. 6A) and as also described above, the inflation module 130 may further comprise a securement element 170 (alternatively referred to as a ring, endcap, cap, engagement element, annular securement member, securement ring, or nut, also not shown in FIG. 6A). The inflation module 130 may, in some embodiments, be configured to be threadably coupled with the securement element 170 (e.g., via a plurality of mating threads of the inflation module 130 and the securement element 170, as shown in FIGS. 4A-C).

FIG. 6B is a perspective view of the aspiration housing 120, according to some embodiments. The aspiration housing 120 can include a plurality of openings 122 formed in the inlet side, or inlet surface, of the aspiration housing 120, which define, at least in part, the aspiration inlet for receiving ambient air into the aspirating airbag inflation assembly 100 (and ultimately the airbag cushion 124) during inflation of the airbag cushion 124, as described in greater detail above. As described in greater detail below, the aspiration housing 120 can comprise a plurality of slots, or brackets, 121 that are configured to receive (e.g., to be physically coupled with) a corresponding plurality of coupling members. For example, the plurality of slots may be configured to each receive a pair of coupling members 151, including flexible prongs 151A and 151B, of the side plate 150 and, thereby, to fixedly couple (e.g., fasten) the side plate 150 to the aspiration housing 120.

In depicted embodiment, the aspiration inlet includes (e.g., comprises) a plurality of openings 122 aligned in a grid pattern along the first side 129 (e.g., bottom surface) of the aspiration housing 120, which openings are defined by cross-members and inflation conduits 140 (shown in FIG. 6B). However, it is contemplated that, in alternative embodiments, the aspiration inlet may comprise a single opening (in some such embodiments, the entire lower side of the aspiration housing 120 may be open) or may comprise any other suitable number of openings 122 as desired.

Figure 6C:
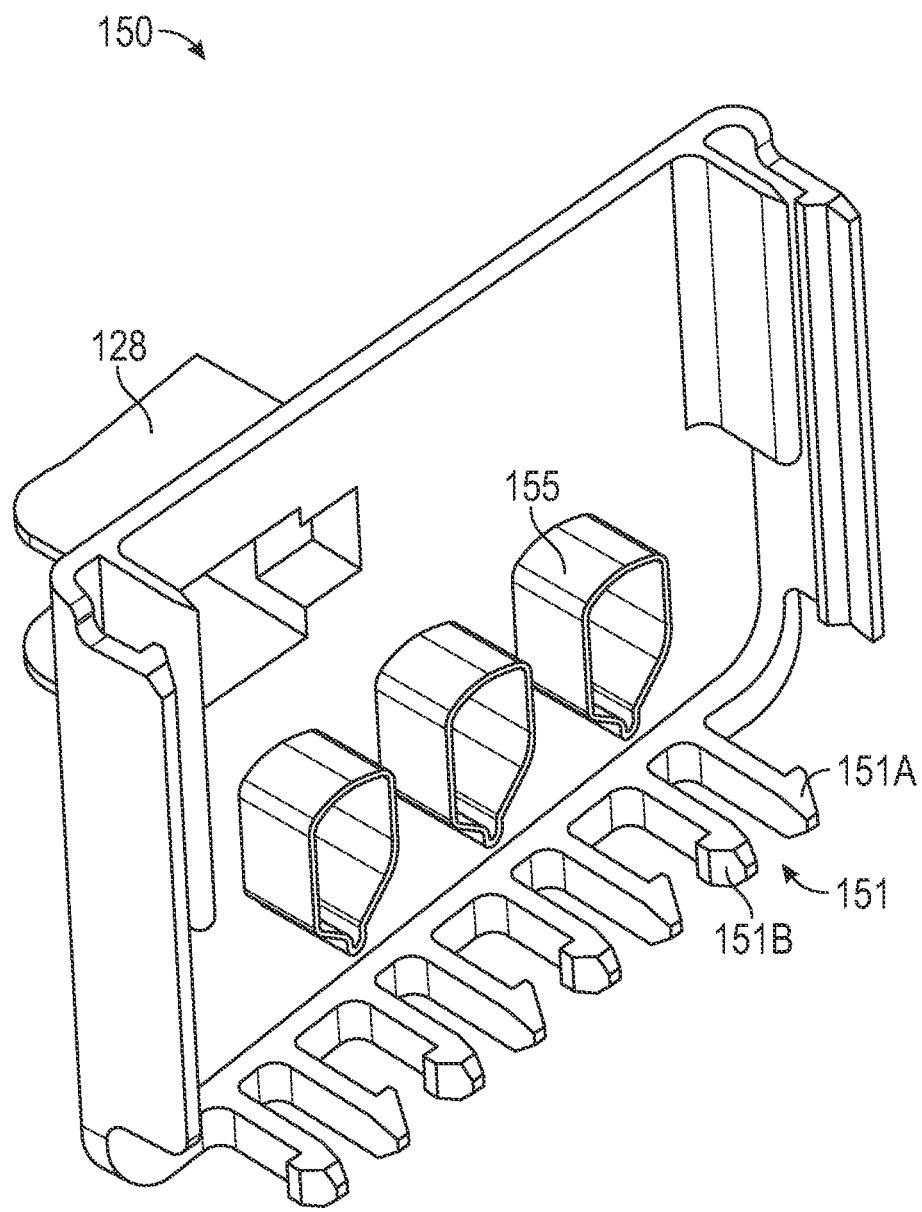
FIG. 6C is a perspective view of an end plate component of an aspirating airbag assembly, according to some embodiments.

FIG. 6C is a perspective view of the side plate 150 of the assembly 100, according to some embodiments. As described above and shown in FIG. 6C, the side plate 150 may include tether release frame 128, which may project or extend a side, or lateral surface, of the side plate 150. In other embodiments, however, the tether release frame 128 may be formed on one or more other surfaces of the assembly 100 (e.g., an exterior surface of the aspiration housing 120 or inflation module 130).

In the depicted embodiment of FIG. 6C and as described above, the side plate 150 forms a plurality of coupling members 151, which are configured to be a plurality of snap-tabs each with a pair of resiliently flexible prongs 151A, 151B. More specifically, each pair of the flexible prongs 151A, 151B may be formed from a flexible plastic material or a material having a predetermined degree of both flexibility and plasticity such that the pair of prongs 151A, 151B can be physically coupled to the plurality of slots 121 formed in the spiration housing 120 by deforming the pair of prongs 151A, 151B sufficiently to insert them into one of the plurality of slots 121 and, after insertion, have each pair of prongs 151A, 151B return to their original (e.g., pre-insertion) form such that the endplate 150 is physically connected to the aspiration housing 120 by inserted pairs of prongs 151A, 151B.

Accordingly, in some embodiments, each pair of prongs 151A, 151B can be received in a slot, or bracket, of the plurality of slots 121. With prongs 151A, 151B received in slots 121, the hooked end portions of the prongs 151A, 151B can engage the outer edges of each of the slots 121 and fixedly couple (e.g., fasten) the side plate 150 with the aspiration housing 120. Similarly, a second plurality of slots, or brackets, (not shown) may be formed in the opposite end of aspiration housing 120, which can receive a second plurality of corresponding coupling members or flexible prongs (or other coupling members) formed in the inflation module 130. The inflation module 130, therefore, may include a plurality of coupling members (not shown) that are substantially similar in operation to the coupling members 151 (and plurality of prongs 151A, 151B) and which may be configured to fixedly couple (e.g., physically connect) the inflation module 130 with the aspiration housing 120.

Figure 7A:
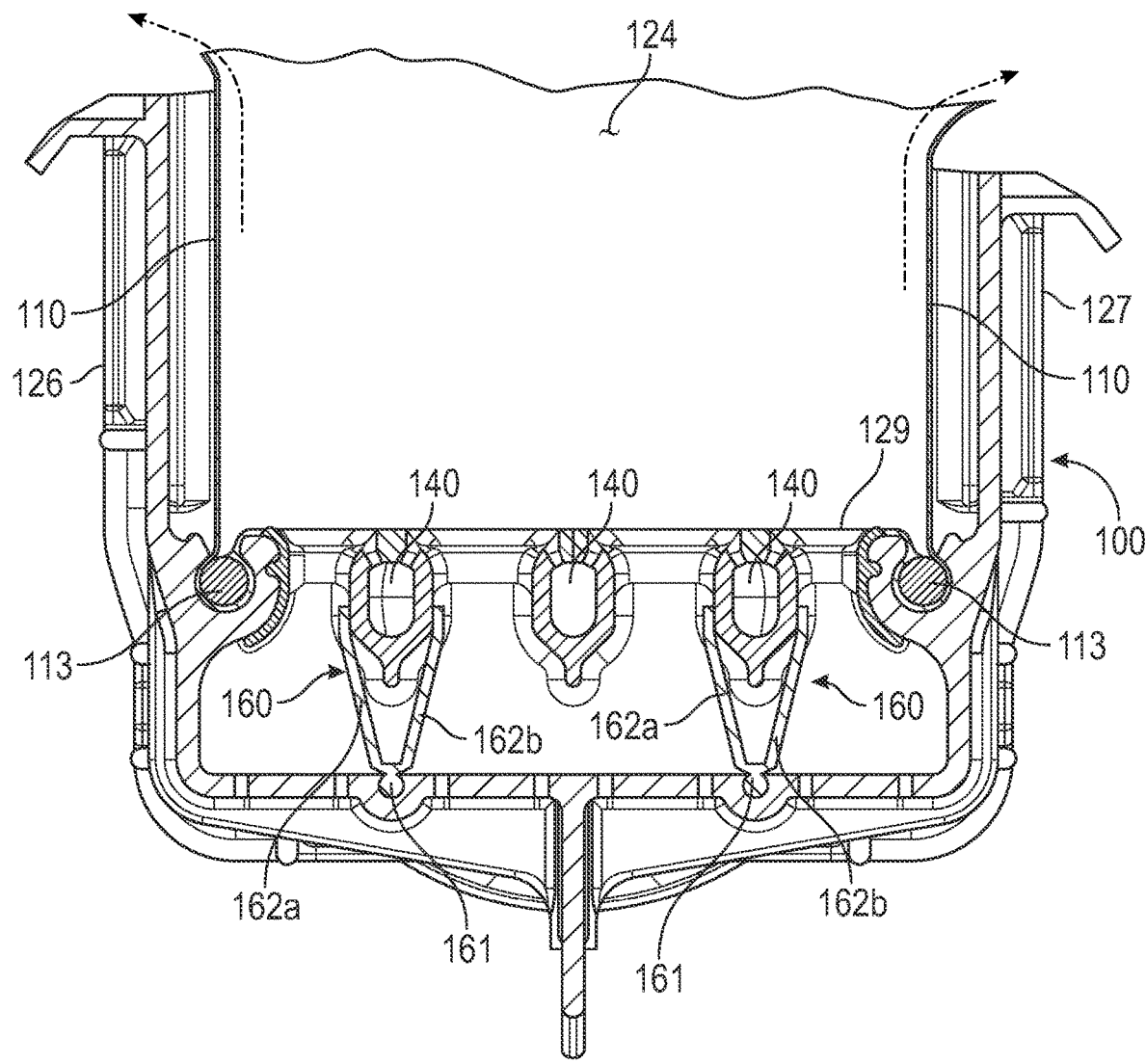
FIG. 7A is a cross-sectional view of an aspirating airbag inflation assembly, according to some embodiments.

FIG. 7A is a cross-sectional view of the aspirating airbag inflation assembly 100, according to some embodiments. As shown in FIG. 7A and described above, the aspirating airbag inflation assembly 100 may further include a valve assembly 160. The valve assembly 160 may include one or more valves preferably configured to automatically open upon actuation of the inflator and further configured to automatically close during inflation of the airbag cushion 124 (not shown in FIG. 7A) to prevent air and inflation gas from exiting through the aspiration inlet below the valve flaps of the valve assembly 160. In some embodiments, the one or more valves of the valve assembly 160 may be configured to automatically close at a predetermined stage during inflation of the airbag cushion.

In the depicted embodiment, the valve assembly 160 comprises a first valve 162a or valve flap and a second valve 162b or valve flap. The valves 162a and 162b may comprise flaps, such as butterfly flaps, that are configured to automatically open and close at least two separate openings of the aspiration inlet. In some embodiments, including the embodiment depicted in FIG. 7A, these flaps may be configured to open and close each of the openings defining the aspiration inlet. In some embodiments, each of the valves 162a and 162b includes two flaps that are pivotably coupled to one another at a central portion, such as hinge portion 161, of the respective valves. Thus, as shown in FIG. 7A, the valves 162a and 162b may be configured to pivot to their respective open configurations during inflation of the airbag cushion 124 (not shown in FIG. 7A) by pivoting their respective flaps at the corresponding central portion 161.

In some embodiments, the valve flaps of the valve assembly 160 may be sufficiently flexible to allow the valve flaps to flex during inflation of the airbag cushion. Additionally, in some embodiments, the valve flaps may be sufficiently rigid so as to maintain a bias towards their respective closed configurations and to close at a predetermined point during the inflation of the airbag cushion 124 and thereby prevent gas from escaping from the airbag cushion 124 during inflation. In other words, the valves 162a, 162b and/or valve flaps may be configured to require a predetermined amount of force, or pressure, to open (generated by a partial vacuum within the airbag cushion 124) and may be otherwise biased towards their respective closed configurations. Although the valve flaps 162a, 162b themselves may be configured to perform this function alone in some embodiments, a support member of such valve flaps, such as a hinge, may be provided to facilitate a desired opening and closing function of the valve flaps 162a, 162b.

In some embodiments, the valve flaps may comprise a relatively rigid material (at least compared to the fabric of airbag cushion 124). In some embodiments, such valve flaps may be configured to operate in a desired manner simply by rigidly coupling such flaps adjacent to the aspiration inlet. Alternatively, the valve flap(s) 162a, 162b may be hinged at one end such that they are biased towards their respective closed positions, as described above. Some embodiments may include a plurality of valve flaps 162a, 162b that partially or fully overlap with one another (e.g., when the valve flaps 162a, 162b are in a closed configuration).

The valve assembly 160 may similarly be physically couplable with the aspiration housing 120. Thus, for example, a pivot point of the flaps 162a, 162b of the valve assembly 160 may include a longitudinal protrusion or bead at the center portion 161, as shown in FIG. 7A (which shows the valve flaps 162a, 162b in an open configuration), which may be slidably received within a corresponding, longitudinal slot formed along the lower portion of the aspiration housing 120.

Again, the cross-sectional view of FIG. 7A depicts the valve flaps 162a and 162b of valve assembly 160 in an open configuration during inflation of airbag cushion 124. As previously mentioned, by directing high-velocity inflation gas through the aspiration ports 142, a pressure differential is generated that preferably results in the opening of the valves and/or valve flaps 162a, 162b of the valve assembly 160 automatically (e.g., without further mechanical elements or other forces or actions). This allows the inflation of the airbag cushion 124 to be supplemented by ambient air, which may enter the airbag cushion 124 through the one or more openings of the aspiration inlet. Preferably, the aspiration ports 142 may be used to generate a sufficient pressure differential to allow for the valve flaps 162a, 162b to automatically open. This same pressure differential may then allow ambient air to assist with inflation of the airbag cushion 124. For example, in some embodiments, inflation gas is introduced in a forceful manner into the airbag cushion 124. Thus, in addition to and/or as an alternative to the pressure differential, the velocity and/or rate of volume of gas delivered through the aspiration ports 142 may be sufficient to cause ambient air to be entrained within the inflation gas and therefore aspirated into the airbag cushion 124 along with the inflation gas of the inflator 132.

At a predetermined point during inflation, the valve flaps 162a, 162b of the valve assembly 160 may automatically close to prevent the air and inflation gas from escaping, or at least reduce the amount of air and inflation gas that may escape from, the airbag cushion 124. Again, this may be accomplished in a number of ways and, in some embodiments, the valve flaps 162a, 162b of the valve assembly 160 may be biased, either by way of a hinge, by way of their physical makeup and coupling/pivot point(s) of attachment, or otherwise, toward their respective closed positions, and thereby be configured to require a threshold amount of force and/or pressure to place the valve flaps 162a, 162b in their open configurations, after which they automatically return to their closed configurations (e.g., upon the pressure, or force, generated by the inflation of the airbag cushion 124 decreasing below the threshold amount of force or pressure).

Figure 7B:
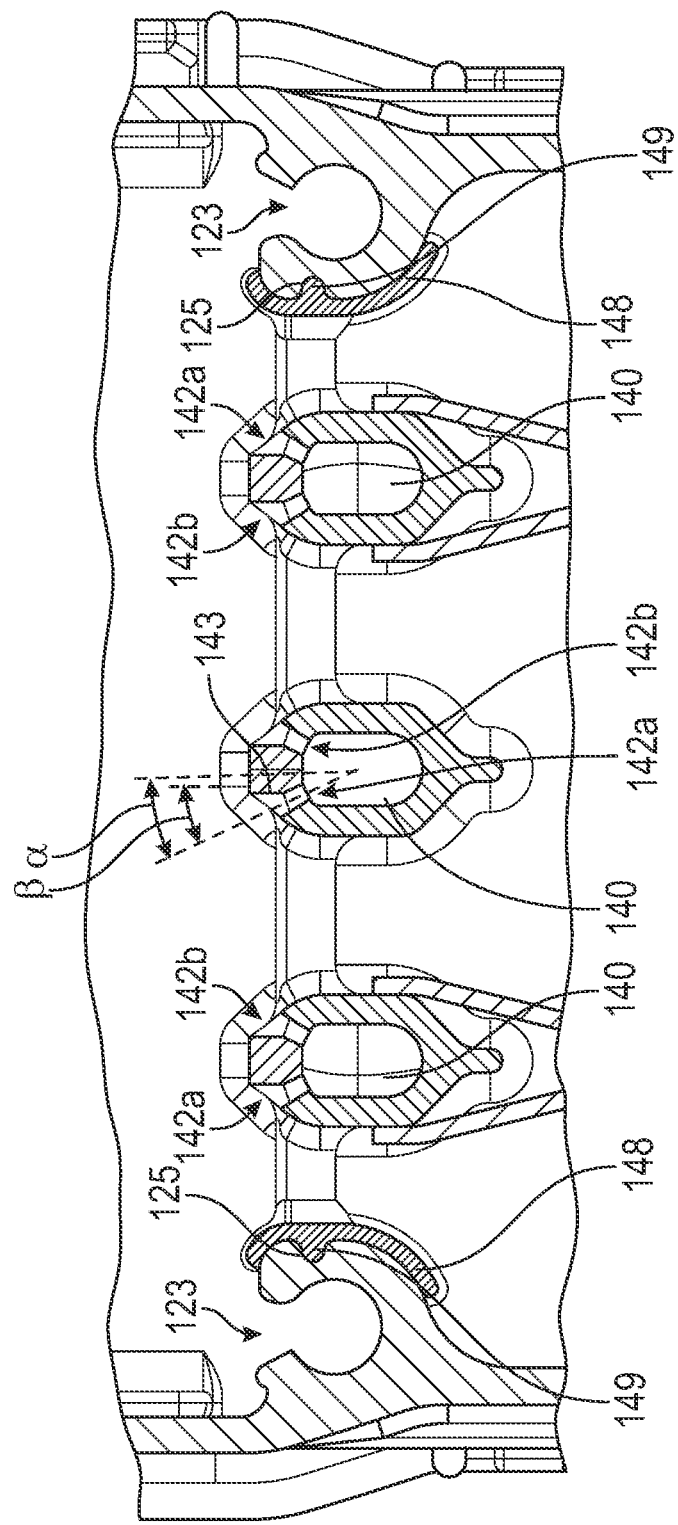
FIG. 7B is a close-up, cross-sectional view illustrating an expansion angle feature for the aspiration ports to improve aspiration efficiency.

Thus, the valve flaps 162a, 162b of the valve assembly 160 are, in some embodiments, configured to operate in a closed configuration initially, and then automatically open during inflation, which may be caused by generating a partial vacuum within the airbag cushion 124 by, for example, the inflation gas from the inflator 132 (not shown in FIGS. 7A-B, see FIGS. 4A-C). Following a predetermined amount of inflation (e.g., at a predetermined point during inflation of the airbag cushion 124), the valve flaps 162a, 162b of the valve assembly 160 may be configured to automatically close again to retain gases (both ambient air and inflation gas) within the airbag cushion 124, which may include during contact by an occupant with the airbag cushion 124. The assembly 100 may be specifically configured to provide for these three stages of the valve flaps 162a, 162b of the valve assembly 160 (closed, open during inflation, and re-closing during or following inflation) automatically at desired times by virtue of the positioning and configuration of the valve assembly 160, airbag cushion 124, inflator 132, and other components of the assembly 100.

More specifically, upon initial deployment, there may be significant pressure achieved in the airbag cushion 124 prior to the airbag cushion 124 breaking through a cover (the "breakout phase" of the deployment). With this high pressure, the potential for leakage out the back of the housing may be very high without blocking the aspiration inlet. Failure to block the aspiration inlet may also inhibit desired cushion restraint. Following the breakout phase, it is preferred that the aspiration inlet be opened as quickly as possible to allow for ambient air to assist in the inflation process Again, following the decrease of the pressure differential previously mentioned, a pressure differential developed in an opposite direction, and/or the cessation of inflation gasses being delivered through the aspiration ports 142, the valve flaps 162a, 162b may be configured to automatically close again. As previously mentioned, in some embodiments, the valve flaps 162a, 162b may be biased towards their respective closed positions to facilitate this stage of inflation. One or more airbag cushion vents (not shown) may be used and may be tuned to provide desired deployment/restraint characteristics. In the depicted embodiment, the aspiration housing 120 may include a pair of longitudinal channels 123 configured to receive a corresponding pair of longitudinal rails 113 formed on airbag cushion package 110, as shown in FIGS. 7A and 7B. This may allow each of the airbag cushion package 110, aspiration housing 120, and inflation module 130 to be slidably coupled to one another and, in some embodiments, without the use of any additional fasteners (e.g., staples, adhesives, rivets, etc.).

As also shown in FIGS. 7A-B, the inflation module 130 may further include a frame defined by a plurality of support members extending perpendicular to the inflation conduits 140. Additional support members may extend parallel to the inflation conduits 140. The parallel support members 148 may reinforce the inflation conduits 140 on opposite ends of the aspiration housing 120. As shown in FIG. 7B, a pair of longitudinal grooves 125 may be formed within aspiration housing 120. And, in some embodiments, the support members 148 may comprise one or more protrusions 149 that may be received within the longitudinal grooves 125.

FIG. 7B also depicts a configuration of the aspiration ports 142, according to some embodiments. In some embodiments, the aspiration ports 142 may form an expanded distal portion that includes an angled surface forming an expansion angle feature, which may further comprise a Prandtl-Meyer feature. In other words, in some embodiments, each of the aspiration ports 142a in a first row of ports may be angled outward towards a first side of its inflation conduit 140 and each of the aspiration ports 142b in a second row of its inflation conduit 140 may be angled outward toward the opposite direction (e.g., relative to the aspiration ports 142a in the first row) towards a second, opposite side of the inflation conduit 140.

Distal of this portion (from the perspective of the inflation gas), one or more surfaces 143 defining an expansion angle are formed, which may open/enlarge the size of the port 142 and/or preferably be angled in the opposite direction relative to the adjacent, proximal portion of the port 142. In some embodiments, including the depicted embodiment of FIGS. 7A and 7B, each angled surface 143 may be angled towards a vertical direction at least substantially corresponding with an incoming direction of ambient air through the aspiration inlet during deployment (vertical is the up direction in FIGS. 7A and 7B). In some embodiments, including the depicted embodiment, the angled surface(s) 143 may further extend in a direction at least substantially perpendicular to a plane extending through each longitudinal axis of each of the plurality of the inflation conduits 140.

In still other embodiments, the aspiration ports 142a and 142b may, in their respective proximal portions, be angled between about 0 degrees and about 45 degrees relative to the vertical direction (angle $\alpha$ in FIG. 7B). In some such embodiments, angle $\alpha$ may be between about 10 degrees and about 30 degrees. In some such embodiments, angle $\alpha$ may be about 25 degrees.

Similarly, in some embodiments, angled surface 143 defines an angle of between about 5 degrees and about 35 degrees relative to an adjacent proximal portion of each of its respective aspiration port (angle $\beta$ in FIG. 7B). In some such embodiments, angle $\beta$ may be about 25 degrees. Thus, in the depicted embodiment, angles $\alpha$ and $\beta$ may be the same, or at least substantially the same, although this need not be the case for all contemplated embodiments.

Again, without being limited by theory, it is thought that this preferred geometry allows the plume to change from the proximal angled portion (about 25 degrees from vertical in some embodiments) to vertical or almost vertical so the plume runs more parallel to the aspirated air flowing into the cushion 124 of the assembly 100. Additionally, the use of Prandtl-Meyer angle surfaces may be useful to create an expansion fan, which, in effect, increases the gas velocity along the outer surface of the plume opposite the angled surface. The turning of the plume along with the outer most surface gas velocity increase may facilitate a more efficient aspiration by, for example, allowing for more aspirated air mass flow compared to inflator gas mass flow required to generate aspiration.

Having now described some illustrative implementations, the foregoing is illustrative and not limiting, having been presented by way of example. In particular, although many of the examples presented herein involve specific combinations of method acts or system elements, those acts and those elements may be combined in other was to accomplish the same objectives. Acts, elements and features discussed in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both "A" and 'B'. Such references used in conjunction with "comprising" or other open terminology can include additional items. References to "is" or "are" may be construed as nonlimiting to the implementation or action referenced in connection with that term. The terms "is" or "are" or any tense or derivative thereof, are interchangeable and synonymous with "can be" as used herein, unless stated otherwise herein.

Directional indicators depicted herein are example directions to facilitate understanding of the examples discussed herein, and are not limited to the directional indicators depicted herein. Any directional indicator depicted herein can be modified to the reverse direction, or can be modified to include both the depicted direction and a direction reverse to the depicted direction, unless stated otherwise herein. While operations are depicted in the drawings in a particular order, such operations are not required to be performed in the particular order shown or in sequential order, and all illustrated operations are not required to be performed. Actions described herein can be performed in a different order. Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any clam elements.

Scope of the systems and methods described herein is thus indicated by the appended claims, rather than the foregoing description. The scope of the claims includes equivalents to the meaning and scope of the appended claims.

What is claimed is:

1. An aspirating airbag inflation assembly, comprising:
   an airbag cushion;
   an aspiration housing fluidly coupled to the airbag cushion, wherein the aspiration housing comprises an aspiration inlet configured to allow for receipt of ambient air into the airbag cushion during inflation of the airbag cushion; and
   an inflation module comprising:
   an inflator;
   a support element configured to physically receive at least a portion of the inflator, wherein the support element comprises a plurality of threads; and
   a securement ring configured to physically engage the support element with the inflator at least partially disposed within the support element, wherein the securement ring comprises a plurality of mating threads to engage the plurality of threads of the support element and retain the inflator within the support element during the inflation of the airbag cushion with a portion of the inflator secured between the securement ring and the support element.

2. The aspirating airbag inflation assembly of claim 1, wherein the securement ring further comprises an opening through a center of the securement ring to provide access to at least a portion of a top of the inflator when the securement element engages the support element to retain the inflator within the support element.

3. The aspirating airbag inflation assembly of claim 2, wherein the inflator further comprises
an activation port physically accessible via the opening through the center of the securement ring with the inflator disposed within the support element when the securement element engages the support element to retain the inflator within the support element.

4. The aspirating airbag inflation assembly of claim 1, wherein the inflator is removable from the support element by disengaging the plurality of threads of the support element from the plurality of mating threads on the securement ring by rotating the securement ring.

5. The aspirating airbag inflation assembly of claim 1, wherein the support element further comprises an inner surface configured to at least partially enclose the inflator within the support element, and wherein the inner surface of the support element is displaced from the inflator by a distance based on a predetermined flow of inflation gas during the inflation of the airbag cushion.

6. The aspirating airbag inflation assembly of claim 1, wherein the plurality of threads is disposed on an outer surface of the support element and the plurality of mating threads is disposed on an inner surface of the securement ring.

7. The aspirating airbag inflation assembly of claim 1, further comprising:
at least one inflation conduit fluidly coupled with the inflator, wherein the at least one inflation conduit comprises a longitudinal axis, wherein the at least one inflation conduit is configured to deliver inflation gas from the inflator into the airbag cushion through a plurality of aspiration ports, and wherein the at least one inflation conduit comprises at least two rows of aspiration ports.

8. The aspirating airbag inflation assembly of claim 7, wherein the at least two rows of aspiration ports are staggered relative to each other on the at least one inflation conduit.

9. The aspirating airbag inflation assembly of claim 7, wherein the plurality of aspiration ports increase in size along the at least one inflation conduit from the inflator.

10. The aspirating airbag inflation assembly of claim 7, wherein the plurality of aspiration ports each expand toward a surface of the at least one inflation conduit.

11. An aspiration housing to be fluidly coupled to an airbag cushion of an airbag assembly, comprising:
an aspiration inlet configured to facilitate introduction of ambient air into the airbag cushion during inflation of the airbag cushion;
a support element at an endplate of the aspirating housing, the support element to receive an inflator to be disposed in fluid communication with the aspiration inlet, wherein the support element comprises a plurality of threads; and
a securement ring configured to physically couple with the support element, wherein the securement ring comprises a plurality of mating threads to engage with the plurality of threads of the support element to secure the inflator at the support element in fluid communication with the aspiration inlet and to retain the inflator during the inflation of the airbag cushion with a portion of the inflator secured between the securement ring and the support element.

12. The aspiration housing of claim 11, wherein the securement ring further comprises an opening through a center of the securement ring to provide access to at least a portion of a top of the inflator when the securement element engages the support element to retain the inflator within the support element.

13. The aspiration housing of claim 12, wherein the inflator further comprises:
an activation port physically accessible via the opening through the center of the securement ring with the inflator disposed within the support element when the securement element engages the support element to retain the inflator within the support element.

14. The aspiration housing of claim 11, wherein the inflator is removable from the support element by disengaging the plurality of threads of the support element from the plurality of mating threads on the securement ring by rotating the securement ring.

15. The aspiration housing of claim 11, wherein the support element further comprises an inner surface configured to at least partially enclose the inflator within the support element with the inflator displaced from the interior surface, and wherein the inner surface of the support element is displaced from the inflator by a distance based on a predetermined flow of inflation gas during the inflation of the airbag cushion.

16. The aspiration housing of claim 11, wherein the plurality of threads is disposed on an outer surface of the support element and the plurality of mating threads is disposed on an inner surface of the securement ring.

17. The aspiration housing of claim 11, further comprising:
at least one inflation conduit fluidly coupled with the inflator, wherein the at least one inflation conduit comprises a longitudinal axis, wherein the at least one inflation conduit is configured to deliver inflation gas from the inflator into the airbag cushion through a plurality of aspiration ports, and wherein the at least one inflation conduit comprises at least two rows of aspiration ports.

18. The aspiration housing of claim 17, wherein the at least two rows of aspiration ports are staggered relative to each other on the at least one inflation conduit.

19. The aspiration housing of claim 17, wherein the plurality of aspiration ports increase in size along the at least one inflation conduit from the inflator.

20. The aspiration housing of claim 17, wherein the plurality of aspiration ports each expand toward a surface of the at least one inflation conduit.

* * * * *